United States Patent
Calmon et al.

(10) Patent No.: US 12,159,237 B1
(45) Date of Patent: Dec. 3, 2024

(54) METHODS AND APPARATUS FOR REAL-TIME ANOMALY DETECTION OVER SETS OF TIME-SERIES DATA

(71) Applicant: EMC IP Holding Company LLC, Hopkinton, MA (US)

(72) Inventors: Tiago Salviano Calmon, Rio de Janeiro (BR); Vinícius Michel Gottin, Rio de Janeiro (BR); John Cardente, Milford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 1422 days.

(21) Appl. No.: 15/884,768

(22) Filed: Jan. 31, 2018

(51) Int. Cl.
G06N 5/04 (2023.01)
G06F 16/2457 (2019.01)
G06N 20/00 (2019.01)

(52) U.S. Cl.
CPC ......... G06N 5/04 (2013.01); G06F 16/24573 (2019.01); G06N 20/00 (2019.01)

(58) Field of Classification Search
CPC ..... G06F 16/24573; G06N 5/04; G06N 20/00
See application file for complete search history.

(56) References Cited

U.S. PATENT DOCUMENTS 9,633,198 B2 * 4/2017 El-Rafei ................. G06F 21/50
10,911,318 B2 * 2/2021 Gopalakrishnan ..... G06N 20/00
2013/0197890 A1 * 8/2013 Ide ....................... G01C 21/3484
    703/6
2014/0195518 A1 * 7/2014 Kelsey .................. G06F 16/367
    707/722
2016/0135706 A1 * 5/2016 Sullivan ................. A61B 5/316
    600/509

(Continued)

OTHER PUBLICATIONS

Fuse, T. et al., "Statistical Anomaly Detection in Human Dynamics Monitoring Using a Hierarchical Dirichlet Process Hidden Markov Model," IEEE Transactions on Intelligent Transportation Systems, vol. 18, No. 11, Nov. 2017, pp. 3083-3092 (Year: 2017).*

(Continued)

*Primary Examiner* — Alexey Shmatov
*Assistant Examiner* — Devika S Maharaj
(74) *Attorney, Agent, or Firm* — Ryan, Mason & Lewis, LLP

(57) ABSTRACT

Methods and apparatus are provided for real-time anomaly detection over sets of time-series data. One method comprises: obtaining a state-space representation of a plurality of states and transitions between said states based on sets of historical time-series data; obtaining an anomaly detection model trained using a supervised learning technique, wherein the anomaly detection model associates sequences of states in the state-space representation with annotated anomalies in the sets of historical time-series data and assigns a probability to said sequences of states; and, for incoming real-time time-series data, determining a likelihood of a current state belonging to a plurality of possible states in the state-space representation; and determining a probability of incurring said annotated anomalies based on a plurality of likely current state sequences that satisfy a predefined likelihood criteria. Anomalous behavior is optionally distinguished from previously unknown behavior based on a predefined likelihood threshold.

20 Claims, 10 Drawing Sheets

(56) References Cited

U.S. PATENT DOCUMENTS

| | | | |
|---|---|---|---|
| 2016/0164721 A1* | 6/2016 | Zhang | H04L 41/142 |
| | | | 709/224 |
| 2016/0239756 A1* | 8/2016 | Aggour | G05B 23/0221 |
| 2017/0124480 A1* | 5/2017 | Sarkar | G01V 1/001 |
| 2017/0365000 A1* | 12/2017 | Wittkotter | G06F 16/2456 |
| 2018/0096261 A1* | 4/2018 | Chu | G06N 20/20 |
| 2018/0183823 A1* | 6/2018 | Fadlil | G06N 3/08 |
| 2018/0324199 A1* | 11/2018 | Crotinger | G06F 16/285 |
| 2019/0155672 A1* | 5/2019 | Wang | H04L 63/1425 |

OTHER PUBLICATIONS

Bezerra, F. et al., "Anomaly Detection Algorithms in Business Process Logs" ICEIS 2008—Proceedings of the 10th International Conference on Enterprise Information Systems (Year: 2008).*

Jyothsna, V. et al., "A Review of Anomaly based Intrusion Detection Systems" (Year: 2011).*

Cheboli, D., "Anomaly Detection of Time Series", https://conservancy.umn.edu/handle/11299/92985 (Year: 2010).*

Fuse, T. et al., "Statistical Anomaly Detection in Human Dynamics Monitoring using a Hierarchical Dirichlet Process Hidden Markov Model", https://ieeexplore.ieee.org/document/7883816 (Year: 2017).*

E. B. Fox, "A sticky HDP-HMM with application to speaker diarization," The Annals of Applied Statistics, pp. 1020-1056, 2011.

Van Der Aalst et al., "Process mining and verification of properties: An approach based on temporal logic," in "OTM Confederated International Conferences" On the Move to Meaningful Internet Systems, 2005.

Van Dongen et al., "The ProM framework: A new era in process mining tool support," ICATPN, vol. 3536, pp. 444-454, 2005.

* cited by examiner

Maximum Length Sequence Algorithm 600 a) For each anomaly:
b) Define maximum length of sequence that leads to anomaly;
c) Take all sequences of maximum length that lead to anomaly; assign scores of 1 for each sequence;
d) Sum the scores, if equal sequences appear;
e) Take support for each sequence, defined as score divided by total number of occurrences of that sequence;
f) Annotate sequences above a certain predefined threshold;
g) Take oldest symbol off (the one that starts the sequence); and
h) If current length equals 1, stop; else go to step d

FIG. 6

METHODS AND APPARATUS FOR REAL-TIME ANOMALY DETECTION OVER SETS OF TIME-SERIES DATA

FIELD

The field relates generally to techniques for anomaly detection over time-series data.

BACKGROUND

Anomaly detection systems are widely applied in contexts with inherent complexity and large volumes of data, such as data center management, industrial applications and in financial scenarios. In data center management and resource administration, for example, the number of possible system states can be overwhelming, and neglecting anomalies may lead to malfunction, failures and a sub-optimal allocation of resources. All of these problems may ultimately result in financial loss and long-term operational problems.

In these scenarios, proper detection of anomalies empowers decision makers to derive an action plan for each state of interest, either by preventing a disruptive effect on subsequent states, triggering self-tuned policies to handle such events or triggering a timely manual intervention to reduce losses. A need therefore exists for improved techniques for real-time anomaly detection.

SUMMARY

In some embodiments, methods and apparatus are provided for real-time anomaly detection over sets of time-series data. An exemplary method comprises: obtaining a state-space representation of a plurality of states and transitions between the states based on sets of historical time-series data; obtaining an anomaly detection model trained using a supervised learning technique, wherein the anomaly detection model associates sequences of states in the state-space representation with annotated anomalies in the sets of historical time-series data and assigns a probability to the sequences of states; and performing the following steps for incoming real-time time-series data: determining a likelihood of a current state belonging to a plurality of possible states in the state-space representation; and determining a probability of incurring one or more of the annotated anomalies based on a plurality of likely current state sequences that satisfy a predefined likelihood criteria.

In some embodiments, anomalous behavior is distinguished from previously unknown behavior based on a predefined likelihood threshold. The anomaly detection model is optionally retrained in response to one or more states being classified as previously unknown behavior.

Other illustrative embodiments include, without limitation, apparatus, systems, methods and computer program products comprising processor-readable storage media.

BRIEF DESCRIPTION OF THE DRAWINGS

FIG. 6 illustrates exemplary pseudo code for a Maximum Length Sequence process, according to one embodiment of the disclosure;

DETAILED DESCRIPTION

Figure 1:
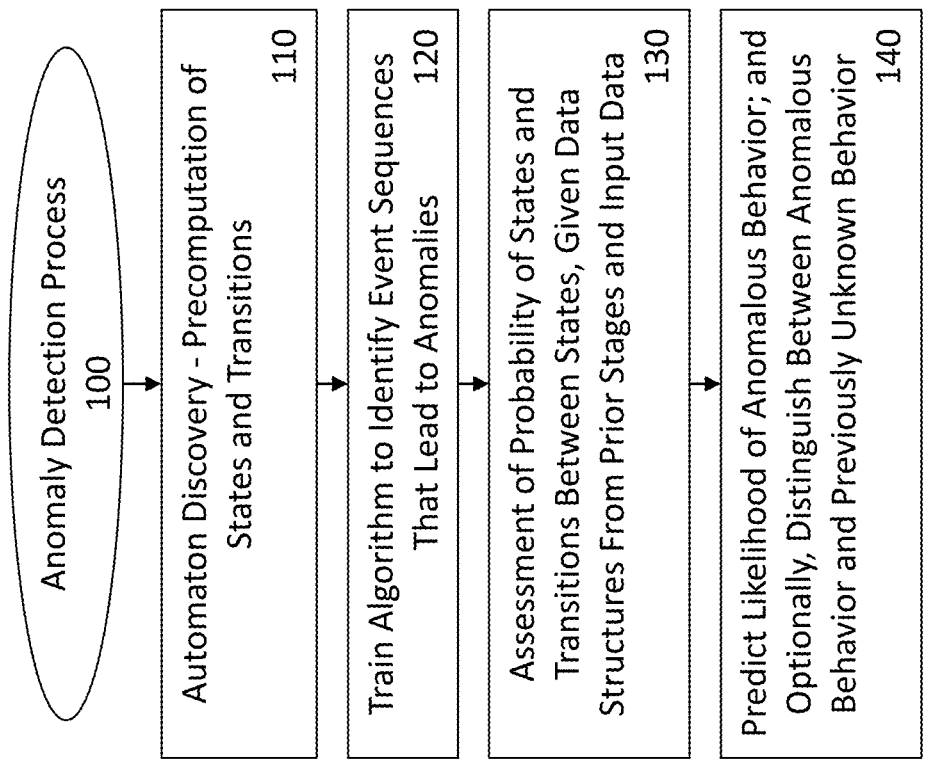
FIG. 1 is a flow chart illustrating an exemplary implementation of an anomaly detection process, according to one embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods and apparatus for real-time anomaly detection over sets of time-series data.

In one or more embodiments, a framework is provided that enables an anomaly detection system that leverages information from multiple sets of time-series data streams generated by a similar process. The disclosed anomaly detection system performs an inference on underlying states and reasons about similarity among states and the likelihood of the inferred transitions. In some embodiments, the disclosed anomaly detection system does not require explicit knowledge of the complete process.

In one or more embodiments, the disclosed anomaly detection framework relies on an assisted discovery of high-level states from large volumes of structured data and performs an inference of a model of probabilistic causality relations between these states. With this model, the framework can use incoming time-series data to assess the probability of upcoming states in real-time. Thus, unlikely states or transitions between states can be identified in real-time and assessed as possible anomalies.

Detecting Operational Anomalies

The creation of high-level probabilistic causality models for decision support thus requires, at least in some embodiments, a way of abstracting these large volumes of data into more readily available, high-level concepts. In one or more embodiments of the present disclosure, a rich high-level probabilistic descriptive model is provided without excessive computation costs through the use of precomputation of a rich learned model of the domain that deals with states, and not the numeric values obtained from sensors.

A typical characteristic of complex scenarios is the large volume of data generated by monitoring systems. Typically, the data comprises sets of time series. For example, in the context of a Data Center Management domain, a single data center may hold thousands of sensors with sampling rates as frequent as milliseconds, generating very large volumes of time-series data that need to be processed in real-time.

Monitoring and detecting operational anomalies in complex domains often require an approach that is capable of dealing with large volumes of data, both in the model generation and in the real-time verification of incoming time series. Approaches that aim to identify anomalies in such contexts face several problems.

Sets of time series typically configure sparse high-dimensional state spaces. Thus, the number of identifiable states in a set of time-series data may be too large for a naïve brute-force computation. In complex domains, the number of distinct relevant states may even be unknown beforehand. Furthermore, considering that sequences of states configure events, this large number of states can lead to a combinatorial explosion in the number of identifiable events.

In a complex domain, the data configuring a new, albeit valid, mode of operation should not be classified as anomalous behavior. The same occurrence (e.g., the shutting down of certain resources in a data center) may be considered anomalous in one case (e.g., for operational faults) and not in another (e.g., for a programmed maintenance shut down). It is often necessary to consider some level of generalization of previously known normal behaviors when searching for anomalies. Furthermore, upon identifying previously unknown (e.g., novel) behavior and previously unknown anomalies, it is important to amend the understanding of the system to include those behaviors or anomalies.

In several domains, as is often the case with the data center management example, anomalies present varying levels of criticality. In several instances, corrective measures must be taken immediately in order to avoid significant losses. This implies that the ingestion of sets of time-series data and anomaly detection must be performed in an online, real-time, manner.

Real-Time Anomaly Detection

FIG. 1 is a flow chart illustrating an exemplary implementation of an anomaly detection process 100, according to one embodiment of the disclosure. One or more embodiments of the exemplary anomaly detection process 100 operate in four stages, as shown in FIG. 1. The first two stages 110, 120 are said to be offline, as they comprise precomputation of a states and transitions model, also referred to as automaton discovery, during stage 110, as well as the tagging of anomalies during an anomaly detection training stage 120 that learns sequences of events that lead to an anomaly. In one or more embodiments, these stages 110, 120 rely on historic sets of time-series data and domain knowledge support; these stages do not rely or require the interaction of the end user or the consumption and interpretation of data as it is generated by the process.

The third and fourth stages 130, 140 are said to be online, as they rely on the real-time ingestion and analysis of the sets of time-series data generated by the scenario process. This analysis is performed, at least in some embodiments, over slices of aligned time series and includes the inference of which state generated the aforementioned slices, the frequency of this inferred state and of the transition leading to it. This frequency is important for one or more embodiments of the disclosed framework: the frequency will serve as a score for novelty/anomaly detection.

The first two stages 110, 120 utilize historic time-series data and domain knowledge to generate data structures to be used by the third stage. The third stage 130 performs the real-time assessment of probability of states and transitions between them, given the data structures generated by the previous stages and input structured data in the same format as the historic data. The fourth stage 140 uses the information generated by the previous three stages to predict anomalous behavior and optionally distinguish between previously unknown and anomalous behavior.

Preprocessing Stages

A. Automaton Discovery

Figure 2:
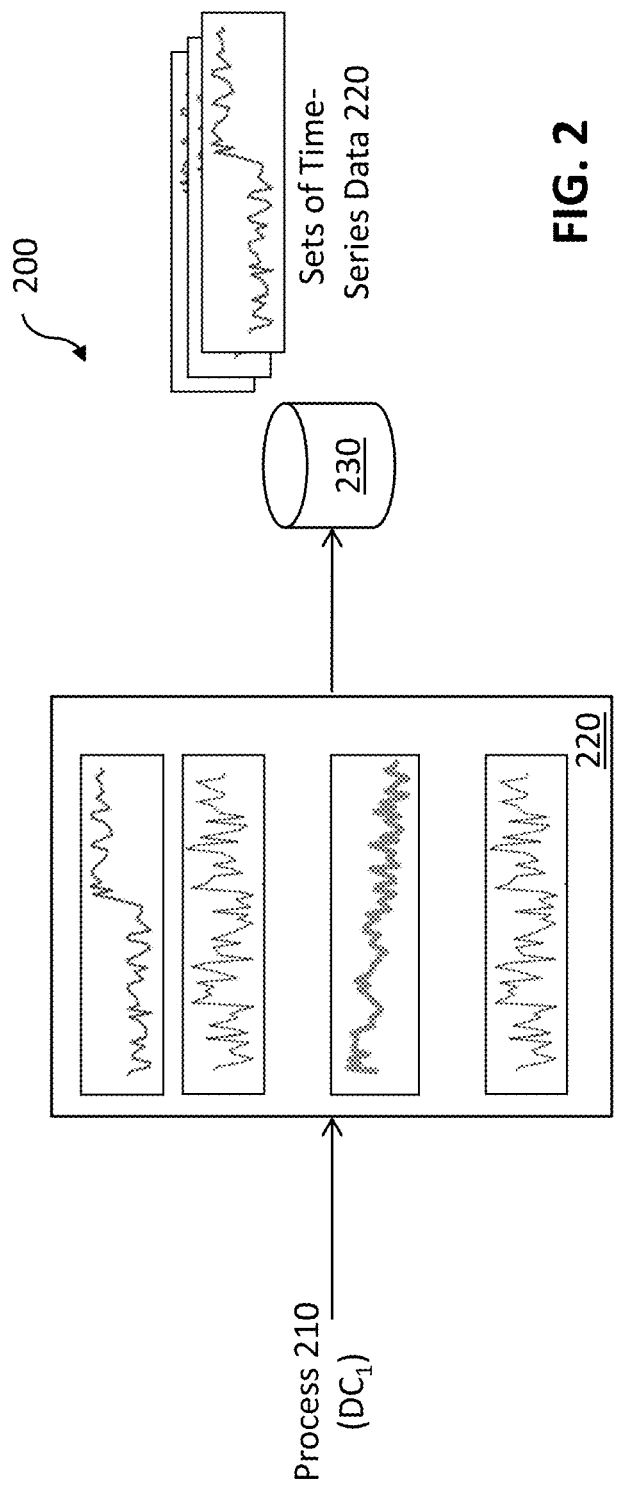
FIG. 2 illustrates an exemplary implementation of the automaton discovery stage of FIG. 1 in further detail, according to an embodiment of the disclosure.

As noted above, the first stage 110 of the exemplary anomaly detection process 100 is the automaton discovery stage, in which the framework stores sets of time-series data generated by distinct instances of a similar process, possibly aggregating multiple time series into one. FIG. 2 illustrates an exemplary implementation 200 of the automaton discovery stage 110 of FIG. 1 in further detail, according to an embodiment of the disclosure. As shown in FIG. 2, a single instance of a process 210, such as process $DC_1$, of a plurality of potential processes 210, generates a set 220 of time-series data to be stored in a data store 230. In practice, several instances of similar processes can each generate a set of time series. The exemplary automaton discovery procedure 200 might be performed over raw time-series data or over compositions of time series.

Figure 3:
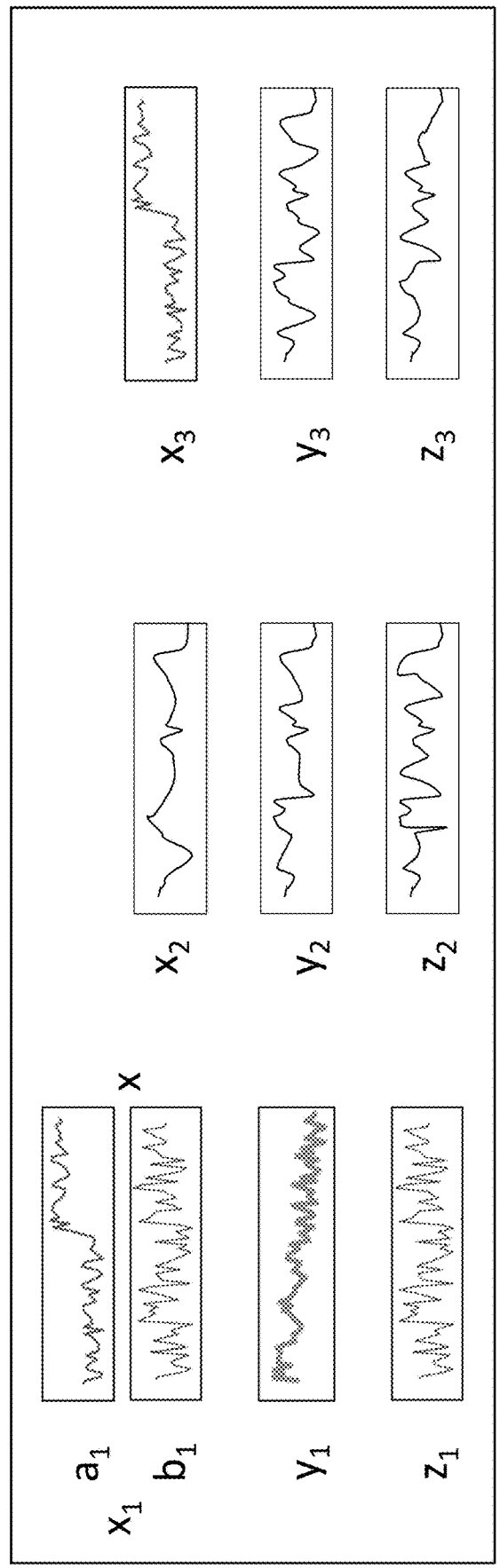
FIG. 3 illustrates a composition of time series by a plurality of processes, according to one embodiment.

FIG. 3 illustrates a composition of time series 300 by a plurality of processes 210-$DC_1$ through 210-$DC_3$, according to one embodiment of the disclosure. As shown in FIG. 3, an exemplary time series $x_1$ is composed by the pointwise multiplication of time series a and b generated by process 210-$DC_1$.

In the example of FIG. 3, the two first time series $a_1$ and $b_1$ generated by process 210-$DC_1$ are multiplied pointwise to generate $x_1$. The resulting time series $x_1$ generated by process 210-$DC_1$ corresponds to the time series $x_2$ and $x_3$, related to process instances 210-$DC_2$ and 210-$DC_3$, respectively. Similarly, the resulting time series $y_1$ generated by process 210-$DC_1$ corresponds to the time series $y_2$ and $y_3$, related to process instances 210-$DC_2$ and 210-$DC_3$, respectively. Likewise, the resulting time series $z_1$ generated by process 210-$DC_1$ corresponds to the time series $z_2$ and $z_3$, related to process instances 210-$DC_2$ and 210-$DC_3$, respectively.

Formally, with k instances of similar processes, it is assumed that through composition rules it is possible to generate from each process instance $P_i$, $1 \leq i \leq k$, an ordered set $\{x_1, \ldots, x_n\}$ of n time series. Defining $x_j^i$ as the j-th time series of $P_i$, it is assumed that a correspondence between $x_j^1$, $x_j^2, \ldots, x_j^k$, for all $1 \leq j \leq n$. By correspondence, corresponding time series are comparable and comprise measurements with substantially the same semantic interpretation.

This composition might be done using predefined rules (e.g., multiplying distance and time to get velocity). Alternatively, the composition of time series with the same kind of data might be performed (e.g., generating a series of the average of two time-series of temperatures).

After the step of collecting (potentially composed) sets of time series, an Expectation Maximization (EM) algorithm is applied to learn states and transitions and encode these within an automaton, as discussed hereinafter.

Figure 4:
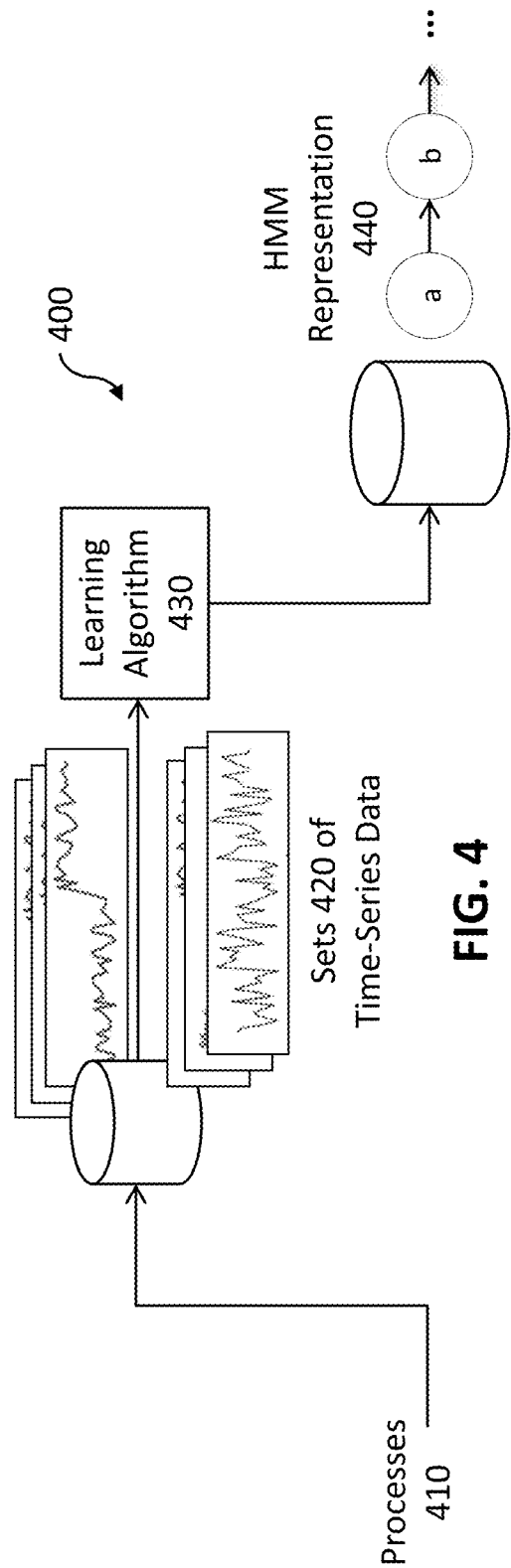
FIG. 4 illustrates an exemplary process for encoding states and state transitions into an automaton, according to some embodiments.

FIG. 4 illustrates an exemplary process 400 for encoding states and state transitions into an automaton, according to some embodiments. As shown in FIG. 4, a plurality of processes 410 generates corresponding sets 420 of time-series data. A learning algorithm 430, such as an EM-Modified Algorithm, is applied to the sets 420 of time-series data to encode the states and transitions into an automaton. See, for example, E. B. Fox, "A Sticky HDP-HMM With Application to Speaker Diarization," The Annals of Applied Statistics, 1020-1056, 2011, incorporated by reference herein.

Although most Hidden Markov Model (HMM) learning algorithms require explicit knowledge of the full set of states before the learning phase, recent breakthroughs involving HMM representation using Bayesian nonparametric priors alleviates this concern using A Hierarchical Dirichlet Processes Hidden Markov Models (HDP-HMMs) learning framework. See, for example, E. B. Fox, "A Sticky HDP-HMM With Application to Speaker Diarization," The Annals of Applied Statistics, 1020-1056, 2011, incorporated by reference herein. Thus, in at least one embodiment of the present disclosure, prior knowledge of the full set of states is not required.

The result of this process 400 is an HMM representation of an automaton 440, represented by states and transitions between states. Even though the number of states is not determined, these states are represented by mixture models over n-dimensional data, where n is defined as the number of different time series in a particular set.

In at least one embodiment of the present disclosure, such mixture models are composed by parametric probability density functions, such as multidimensional Gaussian distributions. In such embodiments, it is possible to assess the online probability of a measurement of a set of time series being an emission of any of the previously discovered states. In practice, this means that it is possible to map a probabilistic value regarding the likelihood of a single observation being a part of previously generated states.

In one or more embodiments of FIGS. 2 and 4, the symbol representing a database implies a massively parallel database environment in which all of the computations are performed and all of the data is stored.

B. Anomaly Detection Training Phase

Figure 5:
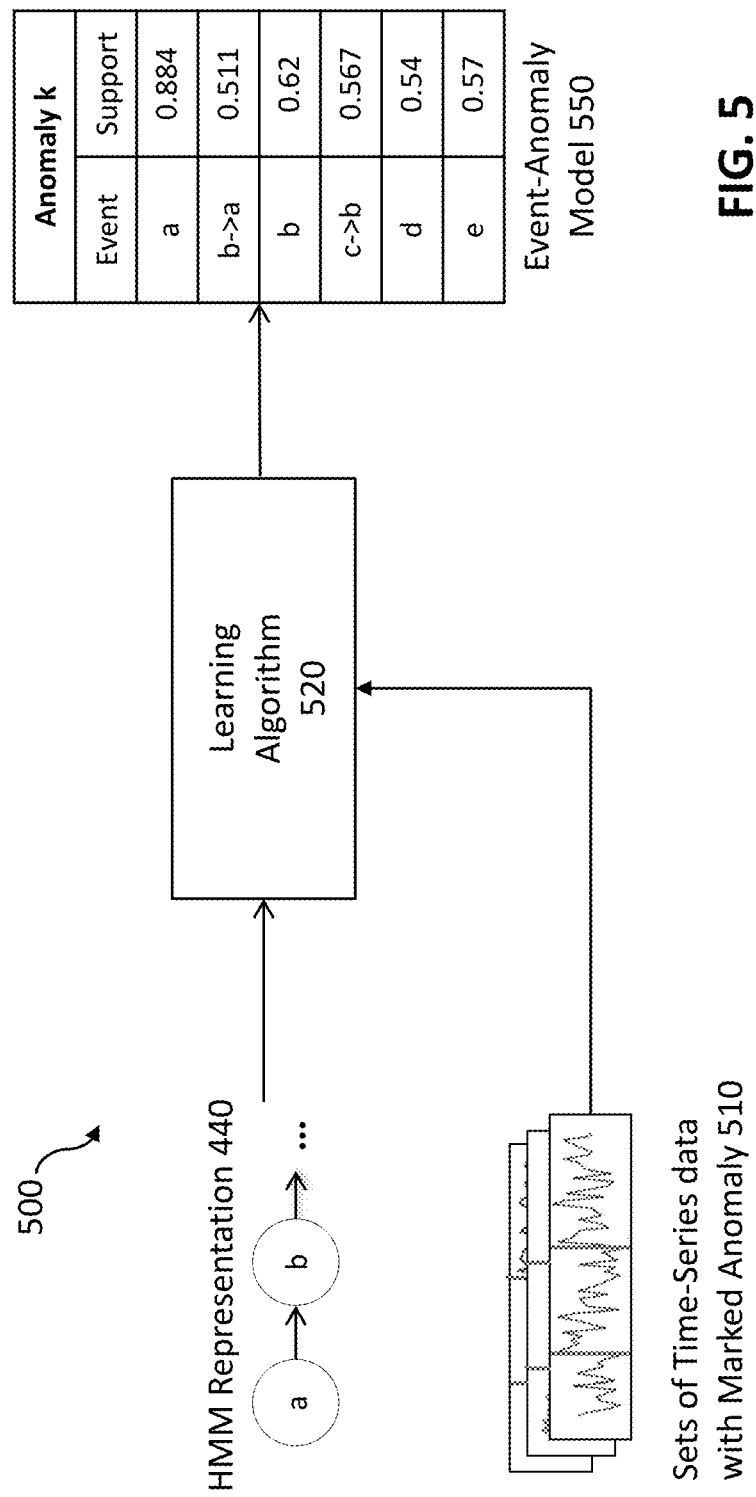
FIG. 5 illustrates an exemplary training algorithm as an implementation of the second offline stage of FIG. 1 in further detail, according to an embodiment.

FIG. 5 illustrates an exemplary training algorithm 500 as an implementation of the second offline stage 120 of FIG. 1 in further detail, according to some embodiments. Generally, the exemplary training algorithm 500 trains a learning algorithm 520 to identify sequences of events that lead to anomalies. As shown in FIG. 5, the exemplary training algorithm 500 detects anomalies based on the discovered automaton 440 (FIG. 4) and time-stamped annotations of anomalies (e.g., sets of time-series data with marked anomalies 510).

The exemplary training algorithm 500 applies the learning algorithm 520 to identify events (e.g., sequences of states) that lead to anomalies. For a discussion of suitable Process Mining techniques, see, for example, W. van der Aalst, H. T. De Beer and B. F. van Dongen, "Process Mining and Verification of Properties: An Approach Based on Temporal Logic," OTM Confederated International Conferences, On the Move to Meaningful Internet Systems (2005); and/or B. F. Van Dongen et al., "The ProM Framework: A New Era in Process Mining Tool Support," ICATPN (Int'l Conf. on Applications and Theory of Petri Nets and Concurrency), Vol. 3536, 444-454 (2005). In addition, association rules can be used to perform this task.

The exemplary learning algorithm 520 may be implemented, for example, as a Maximum Length Sequence process, as discussed further below in conjunction with FIG. 6. While an exemplary sequence mining technique is described herein, any sequence mining technique can be employed that leads to a model relating sequences of states with the occurrence of a particular anomaly can be used, as would be apparent to a person of ordinary skill in the art.

The exemplary learning algorithm 520 generates an Event-Anomaly Model 550 comprising the support for sequences of events leading to the anomalies in the sets of time series data with marked anomalies 510. As used herein, the Event-Anomaly Model 550 identifies a particular anomaly k for ease of explanation.

The annotations can be generated from domain experts, logs written by current systems or a combination of both approaches. This aspect of the disclosure leverages previous systems to derive a new framework for causality assessment of events leading to anomalous behavior.

In one or more embodiments, the exemplary training algorithm 500 generates a table (e.g., Event-Anomaly Model 550) for each of the anomalies of interest. The disclosed framework can work with several learning algorithms. Thus, it is also possible to use one mining method for a particular kind of anomaly and a different mining method for another, if desired. This optional aspect ensures that the system uses the substantially best algorithm to detect each different anomaly.

FIG. 6 illustrates exemplary pseudo code for a Maximum Length Sequence algorithm 600, according to one embodiment of the disclosure. As noted above, the exemplary learning algorithm 520 of FIG. 5 may be implemented as a Maximum Length Sequence process. As shown in FIG. 6, the exemplary Maximum Length Sequence process 600 comprises the following steps:

a) For each anomaly:
b) Define a maximum length of sequence that leads to the anomaly;
c) Take all sequences of the maximum length that lead to the anomaly; assign scores of 1 for each sequence;
d) Sum the scores, if equal sequences appear;
e) Take the support for each sequence, defined as the score divided by the total number of occurrences of that sequence;
f) Annotate the sequences above a certain predefined threshold;
g) Take the oldest symbol off (the one that starts the sequence);
h) If the current length equals 1, stop; else go to step d.

Online Stage

The online stage (stages 130 and 140 of FIG. 1) refers to the reasoning over a current set of time-series data collected in real-time through a monitoring system that is similar to the monitoring systems used to collect the historical data. This online stage leverages the discovered automaton 440 (FIG. 4) and the trained Event-Anomaly Model 550 (FIG. 5) generated by the offline stages (stages 110 and 120 of FIG. 1) in order to identify (and distinguish between) previously unknown and anomalous behavior in the current set of time series.

A. Anomaly Prediction

As noted above, the exemplary anomaly detection process 100 assesses the probability of states and transitions between states, given the data structures from the prior stages 110, 120, and the input data, during the third stage 130.

Figure 7:
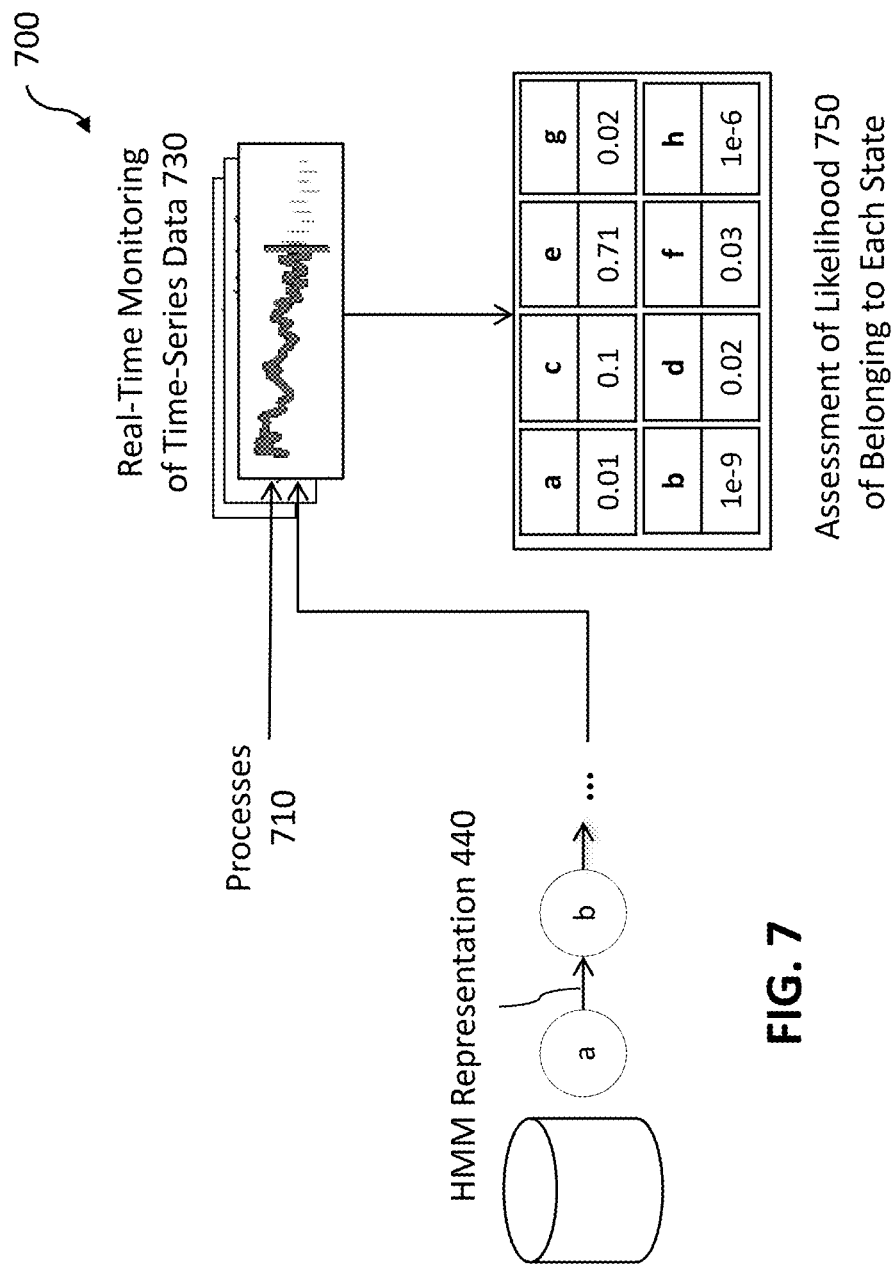
FIG. 7 illustrates an exemplary likelihood assessment process that monitors incoming time-series data to assess a likelihood that the states in the current set of time series belong to each possible state, according to some embodiments.

FIG. 7 illustrates an exemplary likelihood assessment process 700 that monitors incoming time series data 730 from processes 710 to assess a likelihood 750 that the states in the current set of time series belong to each possible state (e.g., states a through h in the example FIG. 7), according to some embodiments. To assess the likelihood of possible ongoing state sequences, the exemplary likelihood assessment process 700 uses a state-space inference technique, as discussed above in conjunction with FIG. 2 and the section entitled "Automaton Discovery," and the Event-Anomaly Model 550.

In at least one embodiment of this disclosure, the assessment of the likelihood of ongoing state sequences may operate over slices of the monitored time-series data, as opposed to over the instantaneous value observations. In that context, slices refer to variable length aggregations of horizontal windows of the time series. A typical example of such an aggregation would be to consider the average of a predefined number of last measurements of each monitored time series as the representative value of that time series in the current state.

Figure 8:
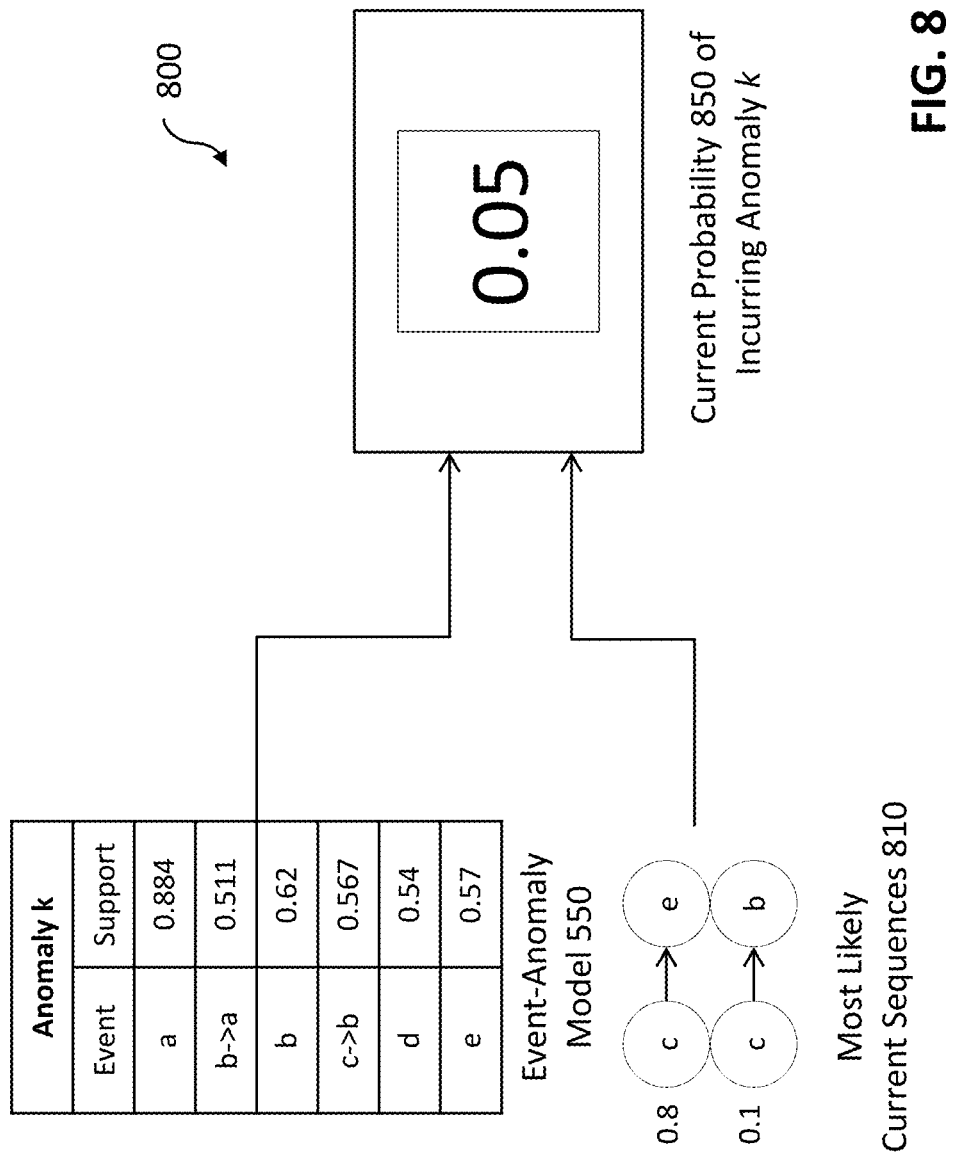
FIG. 8 illustrates an exemplary probabilistic prediction process that predicts anomalous behavior, according to one embodiment of the disclosure.

FIG. 8 illustrates an exemplary probabilistic prediction process 800 that predicts anomalous behavior, according to one embodiment of the disclosure. Generally, the exemplary probabilistic prediction process 800 predicts an anomaly likelihood or probability 850 for the current states in the current set of time-series data.

Given the likelihood assessment 750 of the individual states in the current set of time series (from FIG. 7), the exemplary probabilistic prediction process 800 predicts anomalies by considering the most likely current sequences 810 based on the Event-Anomaly model 550. In the example of FIG. 8, the most likely current sequences 810 comprise a transition from state c to state e, with a probability of 0.8, and a transition from state c to state b, with a probability of 0.1.

The exemplary probabilistic prediction process 800 looks up the most likely current sequences 810 in the Event-Anomaly Model 550 to retrieve the support for the sequences of events leading to anomalies. Individual values may be aggregated into a single probability value through any domain-dependent function. Typically, since the individual support values represent the pondered relevance of that anomaly, that value can be obtained by simple multiplication of the support values of all fitting sequences.

B. Previously Unknown Behavior and Incremental Learning

Besides predicting anomalies, the disclosed anomaly detection framework also optionally supports the distinction between anomalous and previously unknown (e.g., novel) behavior. Consider the example of data center management. Sudden changes in infrastructure may result in changes of the values of the monitored time series. It is not unlikely for such changes to configure states that are not represented in the sets of historical time series used in the offline stage to discover the automaton (stage 110; FIG. 1) and/or train the Event-Anomaly models (Stage 120; FIG. 1). Thus, the mechanism described in this section also supports the incremental learning of the automaton 440 (FIG. 4) and Event-Anomaly models 550 (FIG. 5).

Given the likelihood assessment of the states in the current set of time series (as described above), previously unknown behavior is identified by establishing a threshold of minimum likelihood. Any observation of the current set of time series with a likelihood of belonging to any state below that threshold represents a new state (e.g., a state that is not present in the sets of historical time series used to discovery the automaton). This current state potentially configures a previously unknown behavior or anomaly. The problem of distinguishing previously unknown behavior from an unknown anomaly is referred to as the problem of classification of the current state.

In order to classify the current state, consider the following scenarios:
(1) Complete Knowledge in the Event-Anomaly Model:
If all possible anomalies are known at the anomaly detection training phase (Stage 120; FIG. 1), the current state is classified as previously unknown behavior.
(2) Incomplete Knowledge in the Event-Anomaly Model 550:
In the case where the Event-Anomaly model 550 is incomplete (e.g., there are possible anomalies not represented in the sets of time series used by the exemplary training algorithm 500 of FIG. 5), it might be necessary to rely on domain knowledge in order to correctly classify the current state. This can be done, for example, by reporting the current state for domain experts to label them appropriately.

It is noted that in at least one embodiment of this disclosure, the anomaly detection training phase (FIG. 5) might be stepped over; with the Event-Anomaly model 550 being built in this supervised online manner through domain knowledge input. In typical applications, however, an existing (albeit potentially incomplete) Event-Anomaly model 550 is likely.

In any case, an incomplete Event-Anomaly model 550 can be incrementally changed. In one or more embodiments, certain constraints over features of time series are used to semi-automatically support the classification of the current state. These constraints are often domain-dependent and are assumed to be provided by domain experts. As an example, consider two types of constraints in the above data center management example:
a. Constraints Over the Frequency, Recency an Coherence of the Current State:
If the current state appears frequently (frequency) and repeats itself soon after (recency), it might be indicative of an anomaly. In the data center management example, an unknown state that appears once and is followed by previously known states indicates that no permanent change in the infrastructure was made, and thus probably comprises a temporary anomaly.

In several cases, the frequent discovery of sequences of states may trigger a rediscovery of the automaton model 440.
b. Constraints Over Time Series that Configure the Current State:
Associating rules over the values of particular time series might also be helpful. In the case of the data center management example, consider a rule expressing that, in normal behavior (perhaps extracted as a historical average), the latency between two computational nodes may never exceed 10 ms. When a current state is unknown, checking the instantaneous value(s) of the time series that configure(s) that latency and finding a value above 10 ms is an indication of an anomaly. Conversely, a value below 10 ms may be indicative of valid previously unknown behavior.

Many such rules can be considered concomitantly, with a hierarchical priority (certain constraints can be considered more indicative than others). In one example, the constraint described above may be considered less important than another that states that a certain temperature measure (in normal operation) may never be higher than 90° F. In the case of said latency value being below 10 ms, but said temperature being 98° F., the second rule would take precedence and the state would be classified as an anomaly.

In some embodiments, a framework is provided for building a state-space representation from similar sets of historical time-series data. The framework yields an automaton with probabilities as weights of the transitions, and is capable of inferring the relevant states even in sparse high-dimensional state spaces. Leveraging Bayesian nonparametric priors discovery techniques, the disclosed framework is able produce a Hidden Markov Model, in one or more embodiments, even without full knowledge of the whole set of states. The disclosed techniques for real-time anomaly detection over time-series data also provide the feature of shared sparsity, meaning that a particular observation from a set of time series might correspond to a state originally observed in another set of time series.

In addition, the exemplary anomaly detection framework leverages a HMM and domain knowledge to train an anomaly detection engine, through Process Mining or other supervised learning techniques. The engine associates sequences of states from the HMM to annotated anomalies in sets of time series, as discussed above.

The disclosed framework for anomaly detection can distinguish between anomalies and novelties (e.g., previously unknown behavior) and trigger distinct actions for each of them. Novelty detection is based on a probability assessment of each new observation in relation to the existing states. Anomaly detection, on the other hand, is performed using the association rules derived in the offline anomaly detection training phase, by monitoring incoming data in a time series format; identifying the possible ongoing state sequences using the state-space inference technique and events databases derived in FIGS. 4 and 5, respectively.

The exemplary framework detects changes by comparing current behavior to models trained in the past. If changes in behavior are detected, multiple actions are triggered, depending on how much is assumed to be already known. These range from re-obtaining the HMM automaton to account for previously unknown behavior not in the training data and the possibility of incrementally changing the anomaly probabilistic prediction assessment.

In one illustrative example for a data center, multiple machines emit the same kind of telemetry to the end user. The telemetry includes multiple time series of physical aspects such as Voltage and Temperature, and usage aspects such as percentage of central processing unit (CPU) utilization, allocated memory, cache hit rate, among others.

To compose a state space of each single machine using all of such measurements or observations would be a cumbersome task. The high-dimensionality of the composed observation space makes it naturally sparse, and several possible states might occur only a few times or, even worse, never reoccur. To train a better model of transitions between states, a data center manager could use the disclosed framework, as it allows state discovery using data and enforces shared sparsity, using information from a set of measurements of one machine to discover states occurring for the first time in another.

Furthermore, imagine a particular data center is suffering from unplanned shutdowns. These shutdowns disrupt the business operations and require manual interference of the system administrator to restore them.

The disclosed anomaly detection methodology can train an event-anomaly model using the HMM representation of the states and their transition probabilities alongside data informing the time in which these shutdowns occurred. These pieces of information are used to derive a causality model relating sequences of states (events) that lead to this anomalous behavior. The nature of HMMs combined with the proposed framework allows: detection of such events; and scoring the probability of running into this particular anomalous behavior in the near future.

In some embodiments, this probabilistic assessment allows system administrators to better manage their system and even to propose automatic rules based on thresholds, increase rate of anomaly probability, or any other rule using this metric.

Among other benefits, the disclosed real-time anomaly detection techniques leverage information from multiple sets of time-series data streams generated by a different, but similar process. As noted above, the exemplary disclosed anomaly detection system performs inference on underlying states and reasons about similarity among states and the likelihood of the inferred transitions. In some embodiments, the disclosed anomaly detection system does not require explicit knowledge of the complete process.

One or more embodiments of the disclosure provide improved methods and apparatus for real-time anomaly detection over time-series data. The foregoing applications and associated embodiments should be considered as illustrative only, and numerous other embodiments can be configured using the techniques disclosed herein, in a wide variety of different applications.

It should also be understood that the disclosed real-time anomaly detection techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for real-time anomaly detection over time-series data may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components of the disclosed real-time anomaly detection system are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a real-time anomaly detection platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. These platforms may also be used to implement at least portions of other information processing systems in other embodiments.

Figure 9:
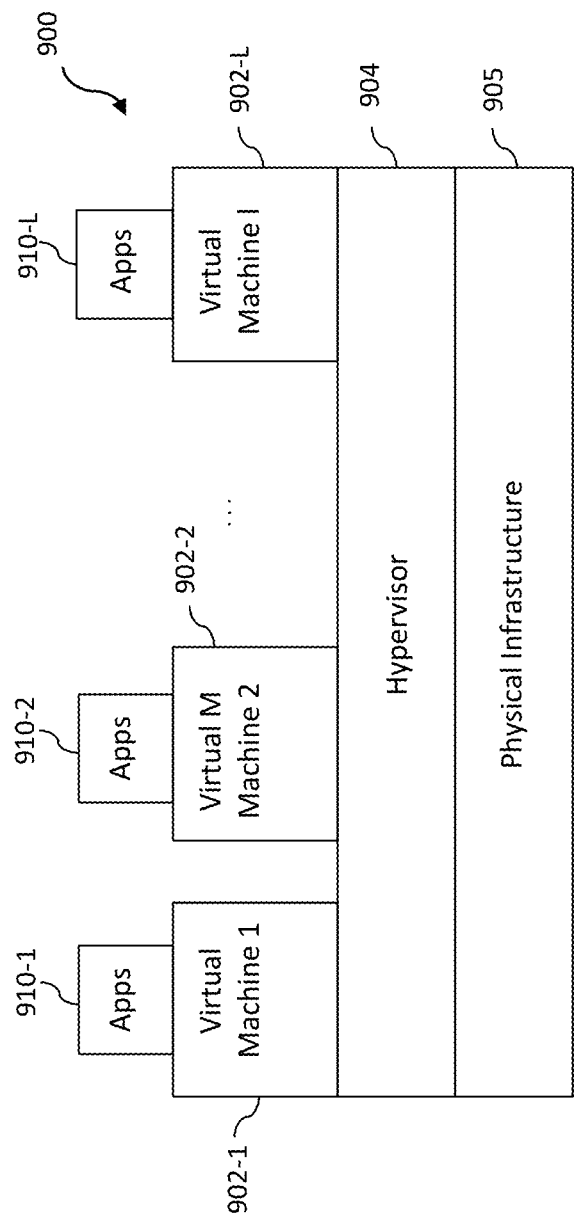
FIG. 9 illustrates an exemplary processing platform that may be used to implement at least a portion of one or more embodiments of the disclosure comprising a cloud infrastructure.

Referring now to FIG. 9, one possible processing platform that may be used to implement at least a portion of one or more embodiments of the disclosure comprises cloud infrastructure 900. The cloud infrastructure 900 in this exemplary processing platform comprises virtual machines (VMs) 902-1, 902-2, . . . 902-L implemented using a hypervisor 904. The hypervisor 904 runs on physical infrastructure 905. The cloud infrastructure 900 further comprises sets of applications 910-1, 910-2, . . . 910-L running on respective ones of the virtual machines 902-1, 902-2, . . . 902-L under the control of the hypervisor 904.

The cloud infrastructure 900 may encompass the entire given system or only portions of that given system, such as one or more of client, servers, controllers, or computing devices in the system.

Although only a single hypervisor 904 is shown in the embodiment of FIG. 9, the system may of course include multiple hypervisors each providing a set of virtual machines using at least one underlying physical machine. Different sets of virtual machines provided by one or more hypervisors may be utilized in configuring multiple instances of various components of the system.

An example of a commercially available hypervisor platform that may be used to implement hypervisor 904 and possibly other portions of the system in one or more embodiments of the disclosure is the VMware® vSphere™ which may have an associated virtual infrastructure management system, such as the VMware® vCenter™. As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC of Hopkinton, Massachusetts. The underlying physical machines may comprise one or more distributed processing platforms that include storage products.

Particular types of storage products that can be used in implementing a given storage system of the real-time anomaly detection engine in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

As is apparent from the above, one or more of the processing modules or other components of the disclosed real-time anomaly detection apparatus may each run on a computer, server, storage device or other processing platform element. A given such element may be viewed as an example of what is more generally referred to herein as a "processing device." The cloud infrastructure 900 shown in FIG. 9 may represent at least a portion of one processing platform.

Figure 10:
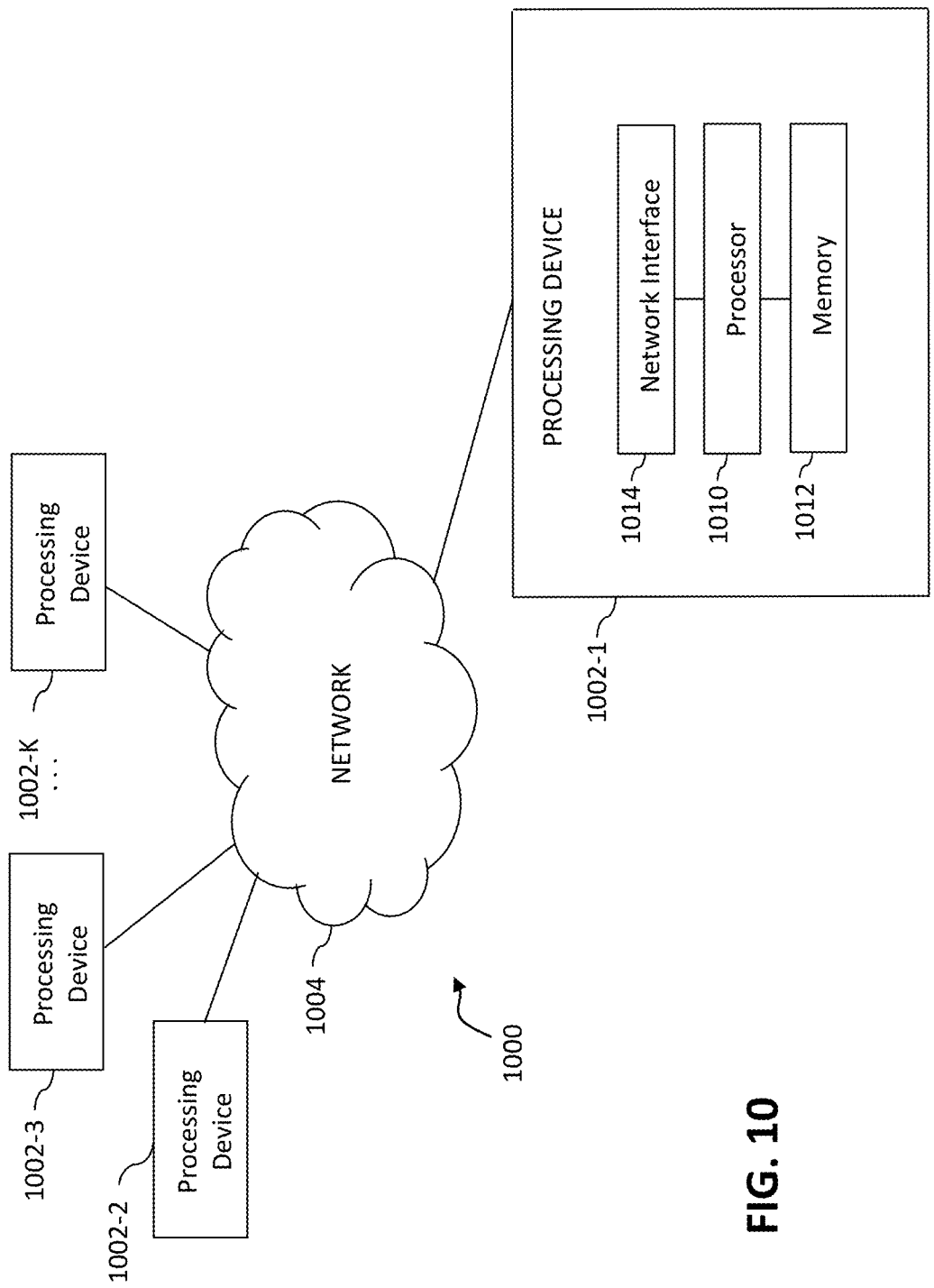
FIG. 10 illustrates another exemplary processing platform that may be used to implement at least a portion of one or more embodiments of the disclosure.

Another example of a processing platform is processing platform 1000 shown in FIG. 10. The processing platform 1000 in this embodiment comprises at least a portion of the given system and includes a plurality of processing devices, denoted 1002-1, 1002-2, 1002-3, . . . 1002-K, which communicate with one another over a network 1004. The network 1004 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1002-1 in the processing platform 1000 comprises a processor 1010 coupled to a memory 1012. The processor 1010 may comprise a microprocessor, a microcontroller, an application specific integrated circuit (ASIC), a field programmable gate array (FPGA) or other type of processing circuitry, as well as portions or combinations of such circuitry elements, and the memory 1012, which may be viewed as an example of a "processor-readable storage media" storing executable program code of one or more software programs.

Articles of manufacture comprising such processor-readable storage media are considered illustrative embodiments.

A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 9 or 10, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in FIGS. 1 through 8 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:
1. A method, comprising:
obtaining a state-space representation of a plurality of states of a given system and transitions between said states based on sets of historical time-series data, wherein the sets of historical time-series data comprise time-series data from a plurality of executions of one or more processes of the given system;
obtaining a plurality of event-anomaly models for respective ones of a plurality of different anomalies, wherein each event-anomaly model is separately learned using a supervised learning technique, wherein a given event-anomaly model of the plurality of event-anomaly models:
(i) comprises a support for one or more sequences of states that lead to a respective annotated anomaly, wherein the respective annotated anomaly is annotated in one or more of the sets of historical time-series data by a domain expert, wherein the support for a given sequence of states that leads to the respective annotated anomaly is based at least in part on a number of occurrences of instances of the given sequence of states that leads to the respective annotated anomaly in the sets of historical time-series data,
(ii) processes states derived from the sets of historical time-series data,
(iii) is separately learned, from the other event-anomaly models, to predict events comprising one or more sequences of states in the obtained state-space representation that lead to the respective annotated anomaly in the sets of historical time-series data, and
(iv) assigns a probability of occurrence to said events, wherein the probability of occurrence of a given event comprises an aggregation of the support for the one or more sequences of states of the given event,
wherein a learning of the given event-anomaly model evaluates a length of the sequences of states that lead to the respective annotated anomaly and updates the given event-anomaly model with the support of the sequences of states that lead to the respective annotated anomaly;
performing the following steps for real-time time-series data, for two or more of the plurality of event-anomaly models:
mapping a current time window of the real-time time-series data to at least one state in the real-time time-series data, wherein the real-time time-series data is obtained at least in part from one or more sensors;
determining a likelihood of one or more events in the real-time time-series data that comprise the at least one state; and
determining a probability of an instance of said respective anomaly associated with the respective event-anomaly model occurring in the real-time time-series data based at least in part on the determined likeli- hoods of the one or more events in the real-time time-series data that satisfy one or more predefined likelihood criteria; and performing at least one automated action for a given instance of a particular anomaly detected based at least in part on the determined probabilities for respective ones of the plurality of different anomalies.

2. The method of claim 1, wherein the step of determining said likelihood of said one or more events further comprises determining a likelihood of a next state based on probabilities of a prior state and a current time-series measurement.

3. The method of claim 1, wherein the step of determining said probability of said instance of said respective anomaly associated with the event-anomaly model occurring in the real-time time-series data further comprises identifying a set of most likely state sequences based on a likelihood of said state sequences; determining a likelihood of incurring one or more of said annotated anomalies for each of said most likely state sequences from the event-anomaly model; and calculating said probability of said one or more states in the real-time time-series data incurring one or more of said annotated anomalies based on said likelihood of said most likely state sequences in said set with said likelihoods for each of said most likely state sequences from the event-anomaly model.

4. The method of claim 1, wherein a particular observation from a set of time series in the state-space representation corresponds to a state originally observed in a different set of time-series data.

5. The method of claim 1, wherein the supervised learning technique comprises a process mining technique.

6. The method of claim 1, wherein said obtaining said state-space representation comprises extracting a Hidden Markov Model (HMM), wherein said transitions are weighted based on a probability of the respective transition.

7. The method of claim 6, wherein the HMM is extracted using a sticky Hierarchical Dirichlet Processes Hidden Markov Model formulation, where a knowledge of the cardinality of a set of states of said Hidden Markov Model is not required.

8. The method of claim 1, further comprising the step of distinguishing between anomalous behavior and previously unknown behavior based on a predefined likelihood threshold.

9. The method of claim 8, wherein an observation in the real-time time-series data that does not satisfy the predefined likelihood threshold comprises a previously unknown state.

10. The method of claim 9, wherein said previously unknown state is classified based on one or more of a substantially complete event-anomaly model and domain knowledge.

11. The method of claim 8, further comprising the step of relearning said event-anomaly model in response to one or more states classified as previously unknown behavior.

12. A computer program product, comprising a non-transitory machine-readable storage medium having encoded therein executable code of one or more software programs, wherein the one or more software programs when executed by at least one processing device perform the following steps:

obtaining a state-space representation of a plurality of states of a given system and transitions between said states based on sets of historical time-series data, wherein the sets of historical time-series data comprise time-series data from a plurality of executions of one or more processes of the given system;

obtaining a plurality of event-anomaly models for respective ones of a plurality of different anomalies, wherein each event-anomaly model is separately learned using a supervised learning technique, wherein a given event-anomaly model of the plurality of event-anomaly models:

(i) comprises a support for one or more sequences of states that lead to a respective annotated anomaly, wherein the respective annotated anomaly is annotated in one or more of the sets of historical time-series data by a domain expert, wherein the support for a given sequence of states that leads to the respective annotated anomaly is based at least in part on a number of occurrences of instances of the given sequence of states that leads to the respective annotated anomaly in the sets of historical time-series data, (ii) processes states derived from the sets of historical time-series data, (iii) is separately learned, from the other event-anomaly models, to predict events comprising one or more sequences of states in the obtained state-space representation that lead to the respective annotated anomaly in the sets of historical time-series data, and (iv) assigns a probability of occurrence to said events, wherein the probability of occurrence of a given event comprises an aggregation of the support for the one or more sequences of states of the given event, wherein a learning of the given event-anomaly model evaluates a length of the sequences of states that lead to the respective annotated anomaly and updates the given event-anomaly model with the support of the sequences of states that lead to the respective annotated anomaly;

performing the following steps for real-time time-series data, for two or more of the plurality of event-anomaly models:

mapping a current time window of the real-time time-series data to at least one state in the real-time time-series data, wherein the real-time time-series data is obtained at least in part from one or more sensors;

determining a likelihood of one or more events in the real-time time-series data that comprise the at least one state; and determining a probability of an instance of said respective anomaly associated with the respective event-anomaly model occurring in the real-time time-series data based at least in part on the determined likelihoods of the one or more events in the real-time time-series data that satisfy one or more predefined likelihood criteria; and performing at least one automated action for a given instance of a particular anomaly detected based at least in part on the determined probabilities for respective ones of the plurality of different anomalies.

13. The computer program product of claim 12, wherein the step of determining said likelihood of said one or more events further comprises determining a likelihood of a next state based on probabilities of a prior state and a current time-series measurement.

14. The computer program product of claim 12, wherein the step of determining said probability of said instance of said respective anomaly associated with the event-anomaly model occurring in the real-time time-series data further comprises identifying a set of most likely state sequences based on a likelihood of said state sequences; determining a likelihood of incurring one or more of said annotated anomalies for each of said most likely state sequences from the event-anomaly model; and calculating said probability of said one or more states in the real-time time-series data incurring one or more of said annotated anomalies based on said likelihood of said most likely state sequences in said set with said likelihoods for each of said most likely state sequences from the event-anomaly model.

15. The computer program product of claim 12, further comprising the step of distinguishing between anomalous behavior and previously unknown behavior based on a predefined likelihood threshold.

16. An apparatus, comprising:
a memory; and
at least one processing device, coupled to the memory, operative to implement the following steps:
obtaining a state-space representation of a plurality of states of a given system and transitions between said states based on sets of historical time-series data, wherein the sets of historical time-series data comprise time-series data from a plurality of executions of one or more processes of the given system;
obtaining a plurality of event-anomaly models for respective ones of a plurality of different anomalies, wherein each event-anomaly model is separately learned using a supervised learning technique, wherein a given event-anomaly model of the plurality of event-anomaly models:
(i) comprises a support for one or more sequences of states that lead to a respective annotated anomaly, wherein the respective annotated anomaly is annotated in one or more of the sets of historical time-series data by a domain expert, wherein the support for a given sequence of states that leads to the respective annotated anomaly is based at least in part on a number of occurrences of instances of the given sequence of states that leads to the respective annotated anomaly in the sets of historical time-series data,
(ii) processes states derived from the sets of historical time-series data,
(iii) is separately learned, from the other event-anomaly models, to predict events comprising one or more sequences of states in the obtained state-space representation that lead to the respective annotated anomaly in the sets of historical time-series data, and
(iv) assigns a probability of occurrence to said events, wherein the probability of occurrence of a given event comprises an aggregation of the support for the one or more sequences of states of the given event,
wherein a learning of the given event-anomaly model evaluates a length of the sequences of states that lead to the respective annotated anomaly and updates the given event-anomaly model with the support of the sequences of states that lead to the respective annotated anomaly;

performing the following steps for real-time time-series data, for two or more of the plurality of event-anomaly models:
mapping a current time window of the real-time time-series data to at least one state in the real-time time-series data, wherein the real-time time-series data is obtained at least in part from one or more sensors;
determining a likelihood of one or more events in the real-time time-series data that comprise the at least one state; and
determining a probability of an instance of said respective anomaly associated with the respective event-anomaly model occurring in the real-time time-series data based at least in part on the determined likelihoods of the one or more events in the real-time time-series data that satisfy one or more predefined likelihood criteria; and
performing at least one automated action for a given instance of a particular anomaly detected based at least in part on the determined probabilities for respective ones of the plurality of different anomalies.

17. The apparatus of claim 16, wherein the step of determining said probability of said instance of said respective anomaly associated with the event-anomaly model occurring in the real-time time-series data further comprises identifying a set of most likely state sequences based on a likelihood of said state sequences; determining a likelihood of incurring one or more of said annotated anomalies for each of said most likely state sequences from the event-anomaly model; and calculating said probability of said one or more states in the real-time time-series data incurring one or more of said annotated anomalies based on said likelihood of said most likely state sequences in said set with said likelihoods for each of said most likely state sequences from the event-anomaly model.

18. The apparatus of claim 16, wherein said obtaining said state-space representation comprises extracting a Hidden Markov Model (HMM), wherein said transitions are weighted based on a probability of the respective transition.

19. The apparatus of claim 16, further comprising the steps of distinguishing between anomalous behavior and previously unknown behavior based on a predefined likelihood threshold and retraining said event-anomaly model in response to one or more states classified as previously unknown behavior.

20. The method of claim 1, wherein the at least one automated action comprises one or more of implementing one or more policies to address a detected anomaly; and updating the state-space representation to account for previously unknown behavior.

* * * * *